United States Patent [19]

Watkins et al.

[11] Patent Number: 4,646,835
[45] Date of Patent: Mar. 3, 1987

[54] ACIDIZING METHOD

[75] Inventors: David R. Watkins, Irvine; Leonard J. Kalfayan, Claremont; Gregory S. Hewgill, Chino, all of Calif.

[73] Assignee: Union Oil Company of California, Los Angeles, Calif.

[21] Appl. No.: 750,319

[22] Filed: Jun. 28, 1985

[51] Int. Cl.[4] .................. E21B 33/138; E21B 43/27
[52] U.S. Cl. ................................ 166/295; 166/300; 166/307; 252/8.551; 252/8.553
[58] Field of Search ............ 166/294, 295, 300, 305.1, 166/307; 252/8.55 R, 8.55 C

[56] References Cited

U.S. PATENT DOCUMENTS

| | | | |
|---|---|---|---|
| 4,479,543 | 10/1984 | Kalfayan et al. | 166/300 |
| 4,498,538 | 2/1985 | Watkins et al. | 166/295 |
| 4,498,539 | 2/1985 | Bruning | 166/294 |
| 4,552,217 | 11/1985 | Wu et al. | 166/295 X |
| 4,553,597 | 11/1985 | Le Ribault et al. | 252/8.55 R X |

*Primary Examiner*—George A. Suchfield
*Attorney, Agent, or Firm*—Dean Sandford; Gregory F. Wirzbicki; Robert A. Franks

[57] ABSTRACT

Subterranean formations are treated with acid, by a method comprising the steps of: (1) forming an acidizing composition by mixing an aqueous acid component with at least one water-soluble organosilicon compound; and (2) injecting the composition into the formation. Suitable organosilicon compounds include water-soluble organosilanes and organosilanes which hydrolyze to form water-soluble silanols. By using the organosilicon compound, movement of formation fine particles is inhibited and swelling of clays by aqueous fluids is reduced, thus tending to maintain formation permeability.

25 Claims, No Drawings

ACIDIZING METHOD

BACKGROUND OF THE INVENTION

1. Field of the Invention

This invention relates to the introduction of fluids into subterranean formations, more particularly to acid treatment of the formations.

2. Description of the Art

Acid treatment, or acidizing, is a very wellknown method for increasing or restoring the permeability of porous subterranean formations, for the purpose of facilitating the flow of fluids, such as crude oil, natural gas, geothermal fluids, and the like, through the formation. In a typical treatment, an acid or mixture of acids is introduced into a formation, through a well which penetrates the formation, using sufficient pressure to obtain a desired distance of penetration into the formation. During the treatment, passageways for the flow of fluids are enlarged and a certain amount of new passageways may be formed. Acidizing effects depend primarily upon the chemical nature of the formation and the acid used, and typically are shown by an increase in fluid production (or fluid injection) rate through the well, after acidizing has been conducted.

Materials which are attacked by the introduced acid can be original components of the formation, and also can be subsequently deposited by well drilling, production, and injection operations after the well has been completed. Very common carbonate-containing formations and clogging deposits are frequently treated with hydrochloric acid. Hydrofluoric acid, a mixture of hydrochloric and hydrofluoric acids, or a mixture of hydrochloric acid and fluoride salts, all of which can be generally described by the term "mud acid," is commonly utilized for removing siliceous materials.

Strong, aqueous mineral acids, however, react almost instantaneously with the first reactive materials encountered as the acids are introduced into a formation. Frequently, these reactive materials are finely divided particles from the formation itself. One undesired result is the consumption of large amounts of acid very near the wellbore, through which acid is injected, and a limited acid penetration into the formation. Adequate penetration depths are achieved only by the use of very large quantities of acid, which itself causes added corrosion problems for well tubing and other subsurface equipment, due to their increased exposure to acidic materials.

These disadvantages have been addressed, at least in part, by adding various materials to the acid which make the acid less reactive initially, but which maintain reactivity over a prolonged period as the acid moves into a formation. Such added materials generally form: (1) emulsions with aqueous acid solutions; or (2) polymeric thickened or gelled acid compositions. Factors such as formation heat are used to decompose the emulsion or polymer, releasing reactive acid in a more or less gradual manner.

U.S. Pat. No. 4,479,543 to L. J. Kalfayan and D. R. Watkins describes a deeper penetrating acidizing method, in which the acid solution injection is preceded by injecting a slug of an organosilane or an ester of an organosilane. Preferably, the organosilane or ester is injected as a solution in a hydrocarbon carrier liquid, to prevent water contact before the material enters the formation to be treated, since water-reacted silane material was thought to penetrate a formation only to a limited extent. One possible mechanism proposed to explain the enhanced acidizing effects observed from use of the method is the coating of formation fines with silane material, which polymerizes and protects the fines against acid attack.

The previously discussed methods for acidizing procedure improvement have the common disadvantage of increased complexity, as compared to normal, simple acid injection techniques. Additional time, energy, equipment, and materials are required to form emulsions which are stable enough for acidizing, and polymer-thickened acids are more difficult to inject into a formation. Multiple injection procedures also suffer somewhat from increased labor and equipment utilization costs.

SUMMARY OF THE INVENTION

The invention is a method for acidizing subterranean formations, comprising forming an acidizing composition by mixing an aqueous acid with at least one water-soluble organosilicon compound, and injecting the composition into the formation.

Aqueous acids which are useful in the invention include mineral acids, organic acids, and mixtures thereof. Fluoride-containing "mud acids" are useful in the practice of the invention.

Organosilicon compounds which are useful include those generally regarded as having considerable water solubility, such as the amino silanes, as well as organosilane materials which hydrolyze in an aqueous environment to form water-soluble silanols.

The organosilicon compound acts to retard the rate of reaction between the acid and components of the subterranean formation, and also reduces the mobility of fine particulate matter in the formation after acidizing has been completed.

DETAILED DESCRIPTION OF THE INVENTION

The invention pertains to methods for acidizing subterranean formations, employing a composition comprising an aqueous acid component and at least one water-soluble organosilicon compound.

Acid components which are suitable for the practice of the invention include aqueous solutions of mineral acids, organic acids, and mixtures thereof. As is known in the art, fluorine-containing acids can be used to treat formations which contain siliceous materials, while non-fluorine acids are more typically used to treat formations which are predominantly non-siliceous. Where it is desired to treat formations such as a carbonate-containing sandstone, where carbonate minerals would rapidly consume fluorine-containing acids, before significant reaction occurs with silica or silicate materials, two separate acid injections into the formation are frequently used: first, a non-fluorine acid is injected to react with carbonates; and subsequently, a fluorine-containing acid is injected to react with silica and/or silicates. The method of this invention can be used in any of these procedures, including various modified procedures which are known in the art.

The mineral acids include, without limitation, hydrochloric acid, nitric acid, hydroiodic acid, hydrobromic acid, sulfuric acid, sulfamic acid, phosphoric acid, mixtures of any of the foregoing acids with one or more water-soluble fluoride salts, hydrofluoric acid, fluoboric acid, hexafluorophosphoric acid, difluorophosphoric acid, fluorosulfonic acid, and mixtures thereof.

The organic acids include, without limitation, formic acid, acetic acid, halogenated derivatives of acetic acid, citric acid, propionic acid, tartaric acid, and mixtures thereof.

Many additives are commonly used in acidizing solutions, such as corrosion inhibitors, surface active agents, viscosity-modifying agents, and the like. These materials are also useful in the practice of the invention and can be present in the acidizing composition.

Suitable water-soluble organosilicon compounds for the invention include, without limitation, amino silanes such as 3-aminopropyltriethoxy silane and N-2-aminoethyl-3-aminopropyltrimethoxy silane, and vinyl silane compounds such as vinyl tris-(2-methoxyethoxy) silane. However, as discussed by M. R. Rosen, "From Treating Solution to Filler Surface and Beyond. The Life History of a Silane Coupling Agent," *Journal of Coatings Technology*, Vol. 50, No. 644, pages 70–82 (1978), many organosilane compounds are water-soluble for prolonged periods of time after they hydrolyze to form silanols, and acids can serve to aid the hydrolysis. For purposes of the present invention, then, compounds which form water-soluble silanols by hydrolysis will be considered as equivalent to the originally water-soluble organosilicon compounds.

Among the organosilanes suitable for use in this invention are those having the formula:

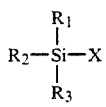

wherein X is a halogen, $R_1$ is an organic radical having from 1 to 50 carbon atoms, and $R_2$ and $R_3$ are the same or different halogens or organic radicals having from 1 to 50 carbon atoms. Preferably, X is a halogen selected from the group consisting of chlorine, bromine and iodine with chlorine being preferred, $R_1$ is an alkyl, alkenyl, or aryl group having from 1 to 18 carbon atoms and $R_2$ and $R_3$ are the same or different halogens, or alkyl, alkenyl, or aryl group having from 1 to 18 carbon atoms.

Suitable specific organosilanes include methyldiethylchlorosilane, dimethyldichlorosilane, methyltrichlorosilane, dimethyldibromosilane, diethyldiiodosilane, dipropyldichlorosilane, dipropyldibromosilane, butyltrichlorosilane, phenyltribromosilane, diphenyldichlorosilane, tolyltribromosilane, methylphenyldichlorosilane, and the like.

Among the esters of the organosilanes suitable for use in this invention are those having the formula:

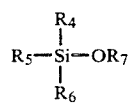

wherein $R_4$, $R_5$, and $R_6$ are independently selected from hydrogen and organic radicals having from 1 to 50 carbon atoms, provided not all of $R_4$, $R_5$, and $R_6$ are hydrogen, and $R_7$ is an organic radical having from 1 to 50 carbon atoms. Preferably, $R_4$, $R_5$, and $R_6$ are independently selected from hydrogen, amine, alkyl, alkenyl, aryl, and carbhydryloxy groups having from 1 to 18 carbon atoms, with at least one of the $R_4$, $R_5$, and $R_6$ groups not being hydrogen, and $R_7$ is selected from amine, alkyl, alkenyl, and aryl groups having from 1 to 18 carbon atoms. When $R_4$, $R_5$, and/or $R_6$ are carbhydryloxy groups, alkoxy groups are preferred.

Suitable specific esters of organosilanes include methyltriethoxysilane, dimethyldiethoxysilane, methyltrimethoxysilane, divinyldimethoxysilane, divinyldi-2-methoxyethoxy silane, di(3-glycidoxypropyl) dimethoxysilane, vinyltriethoxysilane, vinyltris-2-methoxyethoxysilane, 3-glycidoxypropyltrimethoxysilane, 3-methacryloxypropyltrimethoxysilane, 2-(3,4-epoxycyclohexyl) ethyltrimethoxysilane, N-2-aminoethyl-3-propylmethyldimethoxysilane, N-2-aminoethyl-3-propyltrimethoxysilane, N-2-aminoethyl-3-aminopropyltrimethoxysilane, 3-aminopropyltriethoxysilane, and the like.

The acidizing composition is prepared by mixing the components, preferably in an acid-resistant container. Components may be added to the container in any desired order.

In the composition, the acid component usually comprises about 0.5 to about 50 percent by weight, more preferably about 5 to about 50 percent by weight, and the organosilicon component usually comprises about 0.1 to about 10 percent by weight, although, of course, the solubility limit of the component should not be exceeded.

For practicing the method of the invention, it is sometimes preferred to pre-flush the formation by injecting salt solutions, particularly when the formation connate water is quite hard and the acidizing composition contains components which form precipitates with ions in the water, to reduce precipitation of insoluble materials when the acidizing composition contacts the formation. Useful salt solutions include, without limitation, aqueous sodium chloride or ammonium chloride solutions. Hydrocarbon liquids are also useful for a pre-flush of the formation. These liquids, which can include aromatic solvents, are used to dissolve organic materials, such as wax and heavy oil, from mineral or scale surfaces to permit reaction with the acid. The liquids also serve to separate the acid from crude oil, helping prevent the formation of sludges or emulsions caused by the acid-oil oil interaction. The solvent can also contain a glycol ether compound, usually in concentrations of 5 to 10 percent, to help remove emulsion blocks downhole or to leave mineral and scale surfaces water-wet to aid their reaction with acid. Ethylene glycol monobutyl ether is an example of compounds which can be used. The volume of preflush is typically about 1 to about 500 gallons per vertical foot of formation to be treated.

Acidizing is conducted by injecting the composition through a well into the formation, using pressures sufficient to penetrate the formation. Typical volumes of acidizing composition used are about 1 to about 500 gallons per vertical foot of formation to be treated. Penetration can be improved by following this injection with injecting into the formation an afterflush fluid, typically comprising an aqueous solution of a salt, such as ammonium chloride, or a liquid which is immiscible with the acidizing composition, such as a hydrocarbon liquid (crude oil, diesel fuel, kerosene, and the like). The acidizing composition itself and afterflushes often contain a glycol ether compound, such as ethylene glycol monobutyl ether. The glycol ether tends to prevent emulsion blocks and to retard adsorption of other acidizing additives onto the formation face. However, it does not prevent the reaction of the water-soluble organosilanes with the formation. When used in an afterflushing fluid, such as a hydrocarbon liquid, the glycol ether can aid in the removal of acidizing additives, such as corrosion inhibitors, which may have adsorbed on the formation and could restrict flow of fluids through the formation. The afterflush assists in displacing the acidizing composition into the formation, and is typically about 1 to about 500 gallons per vertical foot of formation to be treated.

After the acidizing composition has had sufficient time to react with the formation, the composition is removed from the formation through the well. Following the removal operation, the well can be used for its normal desired purpose, e.g., production from, or injection into, the formation.

While the reaction of the organosilicon compound with materials in the formation is not completely understood, and while the invention is not to be held to any theory of operation, it is believed that the organosilicon compound condenses on and reacts with active sites on siliceous surfaces, with which it comes in contact, to form a polymer. It is believed that a silane monomer first hydrolyzes and forms a reactive intermediate and either the acid or alcohol depending on the type of monomer:

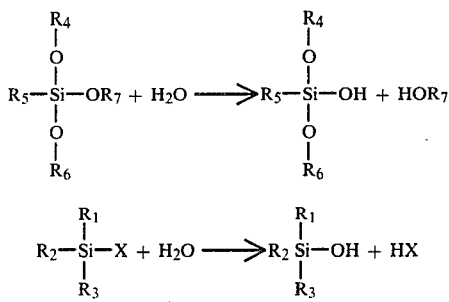

The reactive intermediates, "silanols," then condense to begin formation of the polymer.

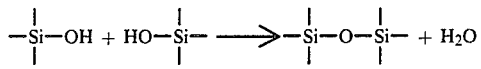

The growth of the polymer can proceed as hydrolysis and condensation continue.

The silanol can also react with active sites on the rock to covalently bind the polymer to it:

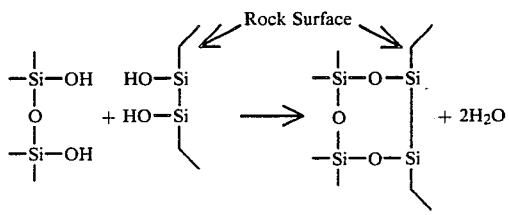

The polymer becomes covalently bonded to any siliceous surface, including clays and the quartz grains which define the pore structure in sandstones or poorly consolidated or unconsolidated formations containing siliceous materials. The polymer acts as a "glue" to bind formation fines in place, thus reducing their movement when a fluid flows through the formation and decreasing their reactivity toward acids. The polymer also coats any water-swellable clays and thereby reduces their subsequent swelling by water-containing fluids.

For purposes of the present invention, "formation fines" are defined as particles small enough to pass through openings of the smallest sieve commonly available (400 U.S. Mesh, or 37 micron openings). The composition of the fines can be widely varied as there are many different materials present in subterranean formations. Broadly, fines may be classified as being quartz, or other minerals such as: feldspars; muscovite; calcite; dolomite; barite; water-swellable clays, including montmorillonite, beidellite, nontronite, saponite, hectorite and sauconite (with montmorillonite being the clay material most commonly encountered); non-water-swellable clays, including kaolinite and illite; and amorphous materials. Fines are present to some extent in most sandstones, shales, limestones, dolomites and the like. Problems associated with the presence of fines are often most pronounced in sandstone-containing formations.

When acidizing solutions contain the organosilicon compounds, a retarded rate of reaction between acids and formation components is obtained. In addition, the apparent coating effect of organosilicon compound reaction products persists after the acidizing solution is no longer present, resulting in stabilization of the fine particulate matter against movement in the formation and a greater retention of the increased permeability obtained by acidizing.

The invention is further illustrated by the following examples which are illustrative of various aspects of the invention and are not intended as limiting the scope of the invention as defined by the appended claims. In the examples, all percentage composition values are expressed on a weight basis.

EXAMPLE 1

An acidizing composition is prepared by mixing together a 15 percent aqueous solution of hydrochloric acid, with sufficient 3-aminopropyltriethoxysilane to comprise 1 percent by weight of the solution. Similarly, an aqueous solution containing 12 percent hydrochloric acid and 3 percent hydrofluoric acid is mixed with sufficient 3-aminopropyltriethoxysilane to comprise 1 percent of the solution.

In both cases, a clear solution is produced, which remains stable and clear, and does not exhibit appreciable changes in viscosity, upon storage in a closed container for over 30 days. Further, it is observed that the capacity of the acid for dissolving finely divided, acid-soluble particles is not significantly diminished by addition of the silane.

EXAMPLE 2

An acidizing solution is prepared by mixing an aqueous solution containing 10 percent hydrochloric acid and 0.5 percent hydrofluoric acid with sufficient 3-aminopropyltriethoxysilane to comprise 0.5 percent of the solution. The solution is heated to about 200° F. and placed in contact with a piece of glass for about 40 minutes. No visible etching of the glass is evident, but a very small amount of insoluble precipitate is noted in the solution.

A similar acidizing solution is prepared, but omitting the silane. This solution is heated to about 200° F. and placed in contact with glass for about 40 minutes, after which considerable etching of the glass is apparent, along with a large amount of insoluble precipitate in the solution.

The example demonstrates the retarded acid reaction rate which is obtained by adding organosilicon compounds to acidizing compositions, in accordance with the invention.

EXAMPLE 3

A cylindrical core sample of a sandstone material, which contains fine particles of hydrochloric acid-soluble siderite, is used for a test of the present invention. The sample is mounted in a high-pressure core holder, after being subjected to a vacuum of 50 torr for about 120 minutes, then being saturated with a 2 percent aqueous solution of sodium chloride. An overburden pressure of about 1,000 p.s.i.g. is applied to the sample and liquids are passed through the sample in either a predesignated "production" or "injection" direction, using a pulseless pump.

Results are summarized in Table I. Fluid "A" is an aqueous solution containing 10 percent hydrochloric acid, 1.5 percent citric acid, and 0.2 percent of a corrosion inhibitor. Fluid "B" is similar to Fluid A, additionally containing 1 percent of 3-aminopropyltriethoxysilane. These results show that a formation which suffers permeability damage from contact with water (step 2) can be stimulated by acidizing, but is again damaged by contact with water (step 6). However, treatment with a silane-containing acid not only improves permeability, but prevents significant damage from subsequent water contact (step 9).

The results further demonstrate the ability of the invention to protect formations against permeability losses from contacting water.

EXAMPLE 5

A sample of the sandstone of Example 3 is subjected to testing, as in that example.

Results are summarized in Table III. Fluid "D" is a solution of 10 percent by weight ethylene glycol monobutyl ether in kerosene; Fluid B is as described in Example 3.

These results demonstrate the utility of the invention for protecting undamaged formations against the effects of water contact. It should be noted that even the formation permeability to kerosene flow is somewhat improved by the injection treatment.

EXAMPLE 6

An additional sample of the sandstone of Example 3 is subjected to testing, using the apparatus, Fluid B, and general procedure of that example.

Results are summarized in Table IV. The results show improvement in formation permeability to both aqueous and organic liquids, following treatment according to the invention.

TABLE II

| Step | Fluid | Flow Direction | Flow Rate (cc/min) | Volume (cc) | Temp. (°F.) | Permeability (millidarcies) | % of Original Permeability |
|---|---|---|---|---|---|---|---|
| 1 | 2% NaCl | Production | 4.74 | 100 | 75 | 21.5 | 100 |
| 2 | H$_2$O | Production | 4.6 | 25 | 75 | — | — |
| 3 | 2% NaCl | Production | 1.87 | 60 | 75 | 1.22 | 5.7 |
| 4 | C | Injection | 2.0 | 95 | 140 | — | — |
| 5 | 2% NaCl | Production | 5.08 | 250 | 75 | 5.51 | 25.9 |
| 6 | 15% NaCl | Production | 5.07 | 100 | 75 | 5.80 | 26.9 |
| 7 | H$_2$O | Production | 5.07 | 250 | 75 | 5.60 | 26.0 |

TABLE I

| Step | Fluid | Flow Direction | Flow Rate (cc/min) | Volume (cc) | Temp. (°F.) | Permeability (millidarcies) | % of Original Permeability |
|---|---|---|---|---|---|---|---|
| 1 | 2% NaCl | Production | 5.0 | 100 | 75 | 126 | 100 |
| 2 | H$_2$O | Production | 5.0 | 20 | 75 | 7.86 | 6.3 |
| 3 | 2% NaCl | Production | 5.0 | 400 | 75 | 7.01 | 5.6 |
| 4 | A | Injection | 1.0 | 50 | 139 | — | — |
| 5 | 2% NaCl | Production | 5.1 | 100 | 75 | 20.8 | 16.6 |
| 6 | H$_2$O | Production | 5.3 | 100 | 75 | 8.51 | 6.8 |
| 7 | B | Injection | 1.0 | 50 | 75 | — | — |
| 8 | 15% NaCl | Production | 5.3 | 100 | 75 | 18.6 | 14.8 |
| 9 | H$_2$O | Production | 5.3 | 300 | 75 | 15.2 | 12.1 |

TABLE III

| Step | Fluid | Flow Direction | Flow Rate (cc/min) | Volume (cc) | Temp. (°F.) | Permeability (millidarcies) |
|---|---|---|---|---|---|---|
| 1 | Kerosene | Production | 3.0 | 400 | 75 | 5.65 |
| 2 | B | Injection | 2.0 | 100 | 140 | — |
| 3 | D | Injection | 5.0 | 200 | 75 | — |
| 4 | Kerosene | Production | 5.17 | 525 | 75 | 5.96 |
| 5 | 15% NaCl | Production | 2.62 | 200 | 75 | 2.22 |
| 6 | H$_2$O | Production | 3.98 | 200 | 75 | 2.17 |

EXAMPLE 4

Another sample of the sandstone of Example 3 is subjected to testing, using the same apparatus and general procedures.

Results are summarized in Table II. Fluid "C" is similar to Fluid B of the preceding example, additionally containing 10 percent of ethylene glycol monobutyl ether.

TABLE IV

| Step | Fluid | Flow Direction | Flow Rate (cc/min) | Volume (cc) | Temp. (°F.) | Permeability (millidarcies) |
|---|---|---|---|---|---|---|
| 1 | 2% NaCl | Production | 2.2 | 400 | 75 | 0.35 |
| 2 | Kerosene | Production | 3.0 | 400 | 75 | 9.80 |
| 3 | B | Injection | 2.0 | 100 | 140 | — |
| 4 | 2% NaCl | Production | 2.2 | 100 | 75 | 3.30 |
| 5 | Kerosene | Production | 3.0 | 300 | 75 | 12.90 |

EXAMPLE 7

A cylindrical core sample of a sandstone which contains fine particles of kaolinite feldspar, quartz, and iron oxide is tested by a method similar to that of Example 3. The sample is saturated with 3 percent sodium chloride solution, and an "overburden" pressure of about 1,000 p.s.i.g. is used.

Results are summarized in Table V. Fluid C is as described in Example 4. Fluid "E" is an aqueous solution containing 10 percent hydrochloric acid, 2 percent hydrofluoric acid, 1.5 percent citric acid, 0.2 percent corrosion inhibitor, and 1 percent 3-aminopropyltriethoxysilane. Fluid "F" is similar to Fluid C, except hydrochloric acid is only 5 percent. As shown in the table, the treatment significantly improves permeability of the core to both aqueous and organic materials.

EXAMPLE 8

A well is completed in an oil-bearing sandstone formation. Following an initial daily production rate of 460 barrels oil and 800 barrels water, production declines at an annual rate about 86 percent, to 220 barrels oil and 400 barrels water per day, at which point the well is shut in. The formation is determined to contain siderite fines, which may migrate and impair fluid permeability.

The well is treated to stabilize production rates. First, a sodium bromide solution, containing a fluid loss agent, is used to kill the well. Water is used to flush the solution out of the well. A 6,000 gallon preflush slug of a high aromatics hydrocarbon solvent is then injected into the formation. Next, 4,000 gallons of an aqueous solution containing 10 percent hydrochloric acid, 10 percent acetic acid, 1 percent 3-aminopropyltriethoxysilane, 0.3 percent corrosion

TABLE V

| Step | Fluid | Flow Direction | Flow Rate (cc/min) | Volume (cc) | Temp. (°F.) | Permeability (millidarcies) |
|---|---|---|---|---|---|---|
| 1 | 3% NaCl | Production | 5.0 | 200 | 75 | 1.45 |
| 2 | Kerosene | Production | 5.0 | 200 | 75 | 1.42 |
| 3 | C | Injection | 2.0 | 100 | 138 | — |
| 4 | E | Injection | 2.0 | 100 | 142 | — |
| 5 | F | Injection | 2.0 | 100 | 142 | — |
| 6 | 3% NaCl | Production | 5.0 | 200 | 75 | 4.91 |
| 7 | Kerosene | Production | 5.0 | 50 | 75 | 25.2 | inhibitor, 10 percent ethylene glycol monobutyl ether, 0.5 percent surfactant, and 5 percent citric acid (hereinafter called "acid solution") are displaced into the formation with about 300 S.C.F. of nitrogen. Following this, 1,000 gallons of 3 percent aqueous ammonium chloride solution also containing 10 percent of a diverting agent (hereinafter called "salt solution") are displaced into the formation with about 300 S.C.F. of nitrogen. Similarly, an additional 4,000 gallons of acid solution, 1,000 gallons of salt solution, and 4,000 gallons of acid solution are sequentially displaced with nitrogen into the formation. Finally, 7,000 gallons of diesel fuel which contains 10% ethylene glycol monobutyl ether are displaced with nitrogen into the formation, as an afterflush.

The well is immediately produced by flowing and about 50 barrels of fluid are recovered. A gas lift, with nitrogen, is used to recover the remaining injected fluids. After returning the well to pump production, a daily production rate of 200 barrels of oil and 250 barrels of water is obtained. Six months later, the daily production rate remains at a high level, 175 barrels oil and 215 barrels water. The rate of production decline has been reduced to about 24 percent per year, by the treatment.

Various embodiments and modifications of this invention have been described in the foregoing discussion and examples, and further modifications will be apparent to those skilled in the art. Such modifications are included within the scope of the invention as defined by the following claims.

What is claimed is:

1. A method for acidizing a subterranean formation, comprising the steps of:
   (a) forming an acidizing composition by mixing an aqueous acid component with at least one water-soluble organosilicon compound; and
   (b) injecting the composition into the formation.

2. The method defined in claim 1 wherein the acid component is selected from the group consisting of mineral acids, organic acids, and mixtures thereof.

3. The method defined in claim 2 wherein the acid component is a mineral acid, selected from the group consisting of hydrochloric acid, nitric acid, hydroiodic acid, hydrobromic acid, sulfuric acid, sulfamic acid, phosphoric acid, mixtures of any of the foregoing acids with one or more water-soluble fluoride salts, fluoboric acid, hexafluorophosphoric acid, hydrofluoric acid, difluorophosphoric acid, fluorosulfonic acid, and mixtures thereof.

4. The method defined in claim 2 wherein the acid component is an organic acid, selected from the group consisting of formic acid, acetic acid, halogenated derivatives of acetic acid, citric acid, propionic acid, tartaric acid, and mixtures thereof.

5. The method defined in claim 1 wherein the organosilicon compound is selected from the group consisting of water-soluble organosilane compounds and organosilane compounds which hydrolyze in aqueous media to form water-soluble silanols.

6. The method defined in claim 5 wherein the organosilane compound is water-soluble.

7. The method defined in claim 6 wherein the organosilicon compound is selected from the group consisting of amino silanes and vinyl silane compounds.

8. The method defined in claim 7 wherein the organosilicon compound is 3-aminopropyltriethoxy silane.

9. The method defined in claim 1 wherein the injecting of step (b) is preceded by a preflushing step, in which a salt solution or a hydrocarbon liquid is injected into the formation.

10. The method defined in claim 1 wherein the injecting of step (b) is followed by an afterflush step, in which an aqueous solution or a hydrocarbon liquid is injected into the formation.

11. The method defined in claim 1 wherein the injecting of step (b) is preceded by a preflushing step, in which a salt solution or a hydrocarbon liquid is injected into the formation, and is followed by an afterflush step, in which an aqueous solution or a hydrocarbon liquid is injected into the formation.

12. A method for acidizing a subterranean formation, comprising the steps of:
  (a) forming an acidizing composition by mixing the components:
    (i) an aqueous solution of an acid selected from the group consisting of mineral acids, organic acids, and mixtures thereof; and
    (ii) an organosilicon compound selected from the group consisting of water-soluble organosilane compounds and organosilane compounds which hydrolyze in aqueous media to form water-soluble silanols; and
  (b) injecting the composition into the formation.

13. The method defined in claim 12 wherein the acid is a mineral acid, selected from the group consisting of hydrochloric acid, nitric acid, hydroiodic acid, hydrobromic acid, sulfuric acid, sulfamic acid, phosphoric acid, mixtures of any of the foregoing acids with one or more water-soluble fluoride salts, fluoboric acid, hexafluorophosphoric acid, hydrofluoric acid, difluorophosphoric acid, fluorosulfonic acid, and mixtures thereof.

14. The method defined in claim 12 wherein the acid is an organic acid, selected from the group consisting of formic acid, acetic acid, halogenated derivatives of acetic acid, citric acid, propionic acid, tartaric acid, and mixtures thereof.

15. The method defined in claim 12 wherein the organosilane compound is selected from the group consisting of amino silanes and vinyl silane compounds.

16. The method defined in claim 15 wherein the organosilane compound is 3-aminopropyltriethoxy silane.

17. The method defined in claim 12 wherein the injecting of step (b) is preceded by a preflushing step, in which a salt solution or a hydrocarbon liquid is injected into the formation.

18. The method defined in claim 12 wherein the injecting of step (b) is followed by an afterflush step, in which an aqueous solution or a hydrocarbon liquid is injected into the formation.

19. The method defined in claim 12 wherein the injecting of step (b) is preceded by a preflushing step, in which a salt solution or a hydrocarbon liquid is injected into the formation, and is followed by an afterflush step, in which an aqueous solution or a hydrocarbon liquid is injected into the formation.

20. A method for acidizing a subterranean formation, comprising the steps of:
  (a) preflushing the formation by injecting a salt solution or a hydrocarbon liquid;
  (b) forming an acidizing composition by mixing the components:
    (i) an aqueous solution of an acid selected from the group consisting of mineral acids, organic acids, and mixtures thereof; and
    (ii) a water-soluble organosilane compound selected from the group consisting of 3-aminopropyltriethoxy silane, N-2-aminoethyl-3-aminopropyltrimethoxy silane, vinyl tris-(2-methoxyethoxy)silane, and mixtures thereof; and
  (c) injecting the composition into the formation.

21. The method defined in claim 20 wherein the acid is a mineral acid, selected from the group consisting of hydrochloric acid, nitric acid, hydroiodic acid, hydrobromic acid, sulfuric acid, sulfamic acid, phosphoric acid, mixtures of any of the foregoing acids with one or more water-soluble fluoride salts, fluoboric acid, hexafluorophosphoric acid, hydrofluoric acid, difluorophosphoric acid, fluorosulfonic acid, and mixtures thereof.

22. The method defined in claim 20 wherein the acid is an organic acid, selected from the group consisting of formic acid, acetic acid, halogenated derivatives of acetic acid, citric acid, propionic acid, tartaric acid, and mixtures thereof.

23. The method defined in claim 20 wherein the injecting of step (c) is followed by an afterflush step, in which an aqueous solution or a hydrocarbon liquid is injected into the formation.

24. The method defined in claim 20 wherein the organosilane compound is 3-aminopropyltriethoxy silane.

25. A method for acidizing a subterranean formation comprising injecting into the formation a composition comprising:
  (a) about 0.5 to about 50 percent by weight of an aqueous acid component selected from the group consisting of mineral acids, organic acids, and mixtures thereof; and
  (b) about 0.1 to about 10 percent by weight of at least one water-soluble organosilicon compound.

* * * * *